United States Patent [19]

Mills et al.

[11] Patent Number: 5,128,846
[45] Date of Patent: Jul. 7, 1992

[54] LIGHT SOURCE

[75] Inventors: Ross N. Mills, Nicholasville, Ky.; Cynthia F. Reeves-Janzen, Boulder, Colo.; Michael D. Ries, Round Rock, Tex.; John C. Scott, Los Gatos, Calif.

[73] Assignee: International Business Machines Corporation, Armonk, N.Y.

[21] Appl. No.: 602,036

[22] Filed: Oct. 23, 1990

[51] Int. Cl.⁵ .................................................. F21S 3/00
[52] U.S. Cl. ..................................... 362/224; 362/31; 362/84; 362/89; 362/223; 362/260; 362/307
[58] Field of Search ............... 362/16, 31, 84, 89, 362/223, 224, 253, 260, 307, 310, 308, 329, 32, 26

[56] References Cited

U.S. PATENT DOCUMENTS

| | | | |
|---|---|---|---|
| 4,110,026 | 8/1978 | Farley et al. | 355/3 R |
| 4,227,939 | 10/1980 | Zewail et al. | 136/247 |
| 4,262,206 | 4/1981 | Viehmann | 250/483 |
| 4,384,973 | 5/1983 | Harnisch | 252/301 |
| 4,460,939 | 7/1984 | Murakami et al. | 362/31 |
| 4,467,208 | 8/1984 | Muller et al. | 250/483.1 |
| 4,492,778 | 1/1985 | Claussen et al. | 523/137 |
| 4,843,524 | 6/1989 | Krent et al. | 362/31 X |

Primary Examiner—Stephen F. Husar
Attorney, Agent, or Firm—Francis A. Sirr; C. E. Rohrer

[57] ABSTRACT

A fluorescent dyed polymer member and a light source are structurally arranged in a manner to efficiently gather light from the light source and then transmit the gathered light to a light utilization device. Light from the light source is gathered over a large area that is occupied by the polymer member. This gathered light is transmitted through the polymer member to an edge portion thereof having a relatively small light emitting area. Light is then emitted as an external beam having a cross section that corresponds to the physical shape of the edge of the polymer member, for example a straight of linear footprint of light. The area brightness of this external beam is greater than the area brightness of the initial light source.

33 Claims, 4 Drawing Sheets

LIGHT SOURCE

FIELD OF THE INVENTION

This invention relates to the field of optical systems and elements, and more specifically to a light source that is structurally arranged with a light transmitting waveguide having a unique property.

BACKGROUND OF THE INVENTION

The concept of converting one electromagnetic wavelength radiation to a different wavelength radiation by the use of a dye-containing polymeric sheet, and then transmitting this different wavelength to an edge surface of the polymeric sheet for detection is known in the art, as is exemplified below.

U.S. Pat. No. 4,227,939 relates to a solar collector for receiving light on one surface, trapping the light in a substrate by internal reflection, and then carrying the light to the edge of the substrate, where the light is emitted into photo voltaic cells. The substrate contains a fluorescent dye, and the substrate can be an acrylic polymer with the dye present as a layer on the back surface of the substrate.

U.S. Pat. No. 4,262,206 relates to a radiation converter wherein radiation is absorbed by a fluorescent dye and re-emitted as a longer wavelength radiation. This longer wavelength radiation is trapped within a substrate member, and is internally reflected by its boundary surfaces towards its ends, whereat the longer wavelength radiation leaves the substrate member, to be detected by an external radiation detector.

U.S. Pat. No. 4,110,026 discloses a fluorescent light concentrator having a fluorescent source that is surrounded on all sides but one by a metal reflector, and with a flat, planar, plastic member containing fluorescent dyes located on the one side of the source. Light is transmitted through the plastic member to end surfaces, at which the light is discharged onto the photoconductor of a xerographic reproduction device. At one location, the light is used to provide pretransfer illumination, and at a second location the light is used to provide preclean illumination. The plastic member is located within the loop of a belt photoconductor, to thereby backlight the photoconductor. The surfaces of the plastic member which do not collect or emit light are covered with a reflective material, to thereby reflect stray light back into the plastic member. It is stated that, "a dye should be chosen which will effervesce to produce light having substantial components in a region of the spectrum where a photoconductor peaks in response or sensitivity." It is also stated, "that the arrangement could be used as an interframe erase lamp".

U.S. Pat. No. 4,460,939 relates to a device for providing a line of light in which a light source is disposed on one focal line of an elliptical reflecting surface, with a plate-like light guide being placed at the second focal line of the elliptical surface. A reflector substantially surrounds the light source, the reflector being formed to have one-half of an elliptical surface and one-half of a cylindrical surface. The result is to concentrate light produced by the light source at the collecting focal line. The light source provides a line of light for an optical reader.

U.S. Pat. No. 4,467,208 relates to a radiation sensor containing a fluorescing material. The exterior surface of the sensor comprises a transparent material, having a core that contains the fluorescent material. Fluorescent light that is produced is conducted to a photosensitive surface.

U.S. Pat. Nos. 4,383,973 and 4,492,778 are of general interest in that they describe the making of dyestuff light collectors.

While devices of the type described above are generally acceptable for their intended purposes, a need remains in the art to provide an efficient light source whose external beam provides a brightness that is a multiple of the brightness of the internal light source, wherein the cross sectional shape of the external beam can easily be shaped as desired, and wherein the shape and size of the originating light source and the external beam can be independently and easily conformed to the dimensional constraints that are provided by the design and construction of a light utilization in which the present invention finds utility.

SUMMARY OF THE INVENTION

The present invention provides the combination of a fluorescent dyed polymer member and a light source structurally arranged in a manner to efficiently gather substantially all of the light from the light source, and then transmit the gathered light to a light utilization device, for example, to an optical shutter or to a Liquid Crystal Display (LCD) device.

A construction and arrangement in accordance with the invention can be used to provide a linear light source at the photoconductor imaging station of a xerographic reproduction device. When used as the light source of an imaging station in a xerographic reproduction device, the wavelength of the emitted light can be optimized to photoconductor sensitivity by selecting a light source having a given wavelength of emission, and/or selecting the dyestuff colors that are used in the polymer member.

An advantage of using a fluorescent dyed polymer member in accordance with the invention is that light from the light source is gathered over a large area that is occupied by the polymer member. This gathered light is then transmitted through the polymer member, to an edge portion thereof. Light is then emitted as a external beam having a cross section that corresponds to the physical shape of the edge of the polymer member, for example, an external beam that can be characterized as a straight or linear footprint of light.

The new and unusual means of the invention for producing an external light beam creates a beam whose area brightness or intensity (i.e., the quantity of light per unit area of the beam) is greater than the area brightness of the originating light source.

The fluorescent dyed polymer member of the invention functions to absorb both direct and diffused light that is generated by the originating light source. This absorbed light may then be transformed to light of a different (usually longer) wavelength(s). The transformed light is then transmitted to the edge(s) of the polymer member, where the light is emitted external of the polymer member as a beam of light. The high magnitude area brightness of this beam is due to the fact that substantial total internal light reflection occurs within the polymer member. The area intensity of the external beam is a function of the ratio of the polymer's edge area to the polymer's surface area of collection. The smaller this ratio, the higher will be the area intensity at the polymer's edge(s). That is, decreasing the polymer's edge area, and/or increasing the polymer's surface collection area increases the area brightness intensity at the edge(s) of the polymer member.

Experiments using the invention have produced a measured gain in light intensity of about eleven times that of a standard fluorescent light source, with the maximum predicted gain, using regression analysis, being in excess of thirteen times that of a standard fluorescent light source. In addition, this invention produces a gain in light intensity that is twice that of an apertured fluorescent light source.

An advantage of the invention is that low light intensity sources, such as electroluminescent lamps, may now be considered for use in devices where the light sources themselves do not provide sufficient area brightness.

A further use of the invention is to provide a spatial light modulator wherein a fluorescent dyed material is used in accordance with the invention to absorb light at a significantly different wavelength than the wavelength that the dyed material emits, thus providing a highly efficient light source having a gain above eleven.

An object of the invention is to provide an elongated light source that generates an elongated light radiation pattern in the form of a cylinder, and a fluorescent-dyed polymeric sheet wrapped to form a cylindrical tube about the light source, the polymeric sheet generally enclosing the light source and having an exposed linear edge from which an external beam is emitted, the polymeric sheet containing a fluorescent dye that is responsive to the radiation from the light source, the fluorescent dye responding to radiation from the tubular light source, and operating to generate fluorescent light within the polymeric sheet, and the fluorescent light being transmitted to the linear edge, whereat light exits the polymeric sheet as a linear beam of light.

Another object of the invention is to provide a method for providing a light beam to a utilization device that requires a beam intensity of a given intensity, wherein a low intensity light source emits light over a relatively large area, the intensity of this emitted light being less than is required by the device, a polymer member being provided to gather substantially all of the light that is emitted by the low intensity light source, and the polymer member having an exposed edge portion of a relatively small cross sectional area, whereby the gathered light is emitted at the location of this edge portion as an external beam having an intensity that is equal to the required beam intensity.

A further object of the invention is to match the spectral characteristic of the above-mentioned external beam to the spectral characteristic needs of a beam utilization device by providing a light gathering, fluorescent dyed, polymer member that operates to absorb emitted light and transforms this absorbed light into light of a spectral characteristic as is needed by the utilization device.

These and other objects and advantages of the invention will be apparent to those of skill in the art upon reference to the following detailed description of the invention, which description makes reference to the drawing.

DETAILED DESCRIPTION OF THE INVENTION

Figure 1:
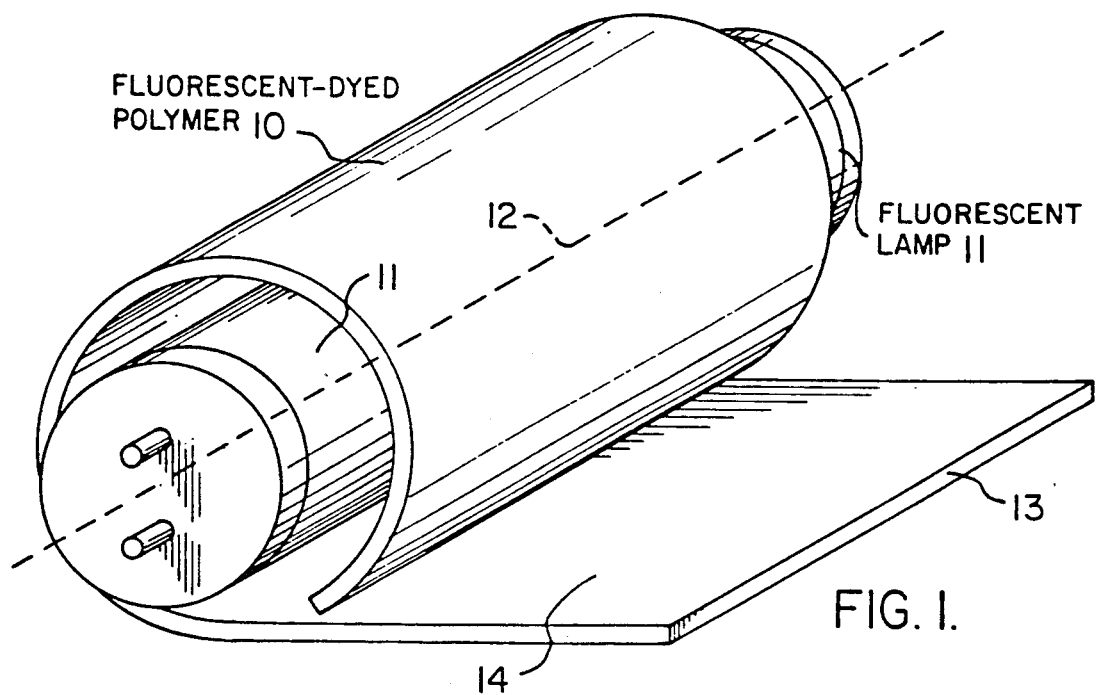
FIG. 1 is a perspective view of an embodiment of the invention wherein a fluorescent dyed polymer member is wrapped about a fluorescent lamp.

The present invention provides an improved light source means wherein a fluorescent dyed polymer member and a light source are arranged to gather light from the light source and transmit the gathered light to a light utilization device. Light from the light source is gathered over a large area that provides a relatively low light intensity per unit area. This gathered light is transmitted through the polymer member to an edge portion thereof. Light is then emitted as an external beam of relatively small cross section, the area brightness of this external beam being greater than the area brightness of the gathered light.

Utility for the invention will be readily apparent to those of skill in the art. Representative utility is as the illumination source of an optical printhead, as the illumination source for a photoconductor imaging station of a copier device, in optical data processing and optical data memory devices, as an optical pump for use with a rod laser, in high intensity optical displays, and as the illumination source of an optical scanner.

Certain embodiments of the invention provide a fluorescent dyed polymer member that is wrapped entirely around the light source. Other embodiments provide that the polymer member is molded into a geometric shape to surround one or more light sources.

In order to prevent light from being refracted out of the polymer member, ink or paint having a high density of white pigment can be coated onto the external faces of the polymer member, excluding of course the areas thereof that receive light from the light source(s), and the exposed edge(s) whereat light exits the polymer member. This effect can also be accomplished by metallizing these face and edge portions of the polymer member.

The various embodiments of the invention provide a unit area light amplifier in which light is directed unto a polymeric light collecting slab that contains fluorescent dye molecules. Light is absorbed by these fluorescent dye molecules, which molecules in turn emit light of a different spectral characteristic. This emitted light is guided by total internal reflection to the edges of the collecting slab. The construction of the edges of the slab are such that the light is contained within the slab, the light being allowed to escape only at the desired light emitting edge thereof.

An embodiment of the invention provides a plastic sheet containing fluorescent dye molecules and surrounding a fluorescent light tube, the plastic sheet being surrounded in turn by a encircling mirror.

Another embodiment of the invention provides three such plastic sheets arranged in a cascaded concentric arrangement, and containing three different fluorescent dye molecules, and surrounding a single fluorescent light tube, so as to provide three different color wavelengths, for example to provide a light source for a color printer utilizing photoactive toners.

As a feature of the invention, the light emitting edge of the plastic sheet(s) may be tapered wide to narrow, for example to provide a more narrow exit beam.

FIG. 1 is a perspective view of a basic configuration of the invention, showing a fluorescent dyed polymer slab member 10 that is wrapped to form a hollow circular cylinder about a linear light source in the form of fluorescent lamp 11. While not critical to the invention, it is preferred that the central axis of lamp 11 and the central axis of the polymeric cylinder coincide with axis 12.

In the linear light source of FIG. 1, lamp 11 provides a light pattern in the form of an elongated cylinder that corresponds to the polymeric cylinder. This polymeric cylinder is generally equal in length to this light pattern. In this manner, the polymeric sheet or slab generally encloses lamp 11, and operates to gather all of the light emitted thereby. The linear light source of FIG. 1 comprises the exposed linear edge 13, extending generally parallel to axis 12.

The fluorescent dye within sheet 10 is responsive to radiation from lamp 11, and this dye responds to this radiation and operates to generate fluorescent light within sheet 10. This generated light is transmitted through sheet 10 to linear edge 13, whereat the fluorescent light exits sheet 10 as a line or beam of light having a cross section as is determined by the cross-sectional shape of edge 13.

Figure 2:
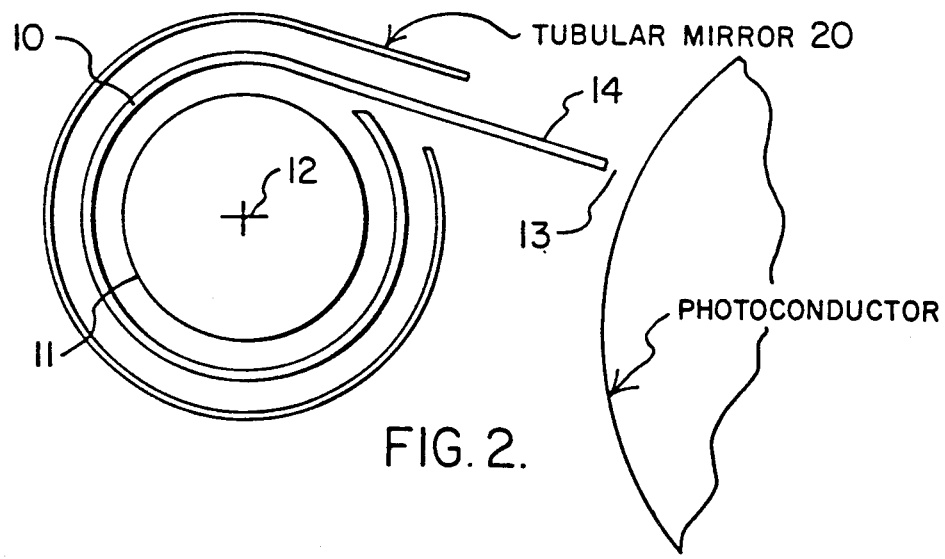
FIG. 2 is a side view of the embodiment of FIG. 1 wherein the invention's emitted light beam is used as a remotely located pretransfer, preclean or erase illumination source in a xerographic reproduction device such as a printer or a copier, this figure also showing use of an optional surrounding mirror.

FIG. 2 shows a feature of the invention wherein the polymeric tube or cylinder of FIG. 1 is substantially transparent to radiation from lamp 11, and including an optional tubular mirror 20 that surrounds the polymeric tube, mirror 20 operating to redirect radiation from lamp 10 back into the polymeric tube.

Figure 3:
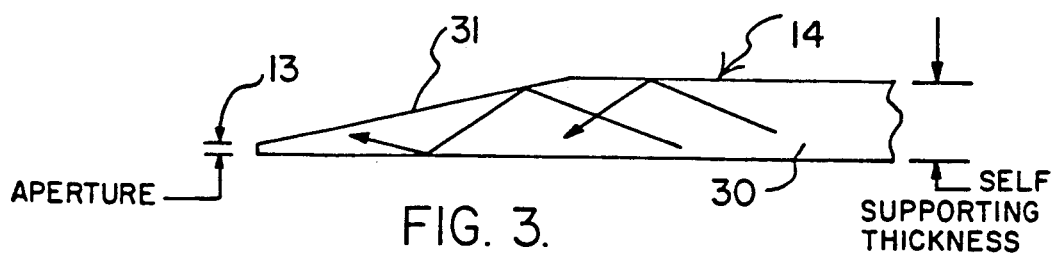
FIG. 3 shows the side view of a feature of the invention whereby the extending polymer edge portion of the embodiments of FIGS. 1 and 2 is formed to be relatively thick, so as render this edge portion self supporting, and wherein a tapered end is provided on this edge portion, so as to conform the emitted light beam to a thickness that is required by a beam utilization device.

FIG. 3 shows another feature of the invention whereby the extending polymer edge portion 14 of FIGS. 1 and 2 is formed to be relatively thick in area 30, so as render edge portion 14 self supporting, and wherein a tapered end 31 is provided in order to conform the emitted light beam to a thickness that is required by the beam utilization device with which the light source is used. While the FIG. 3 embodiment of the invention shows tapering of end 31 in the vertical dimension, it will be appreciated that this end portion can also be tapered in a direction orthogonal thereto.

As will be appreciated by those skilled in the art, the use of extending edge portion 14 of various lengths allows the invention to provide light to a light utilization device without subjecting the device to heat that is generated by lamp 11.

Figure 4:
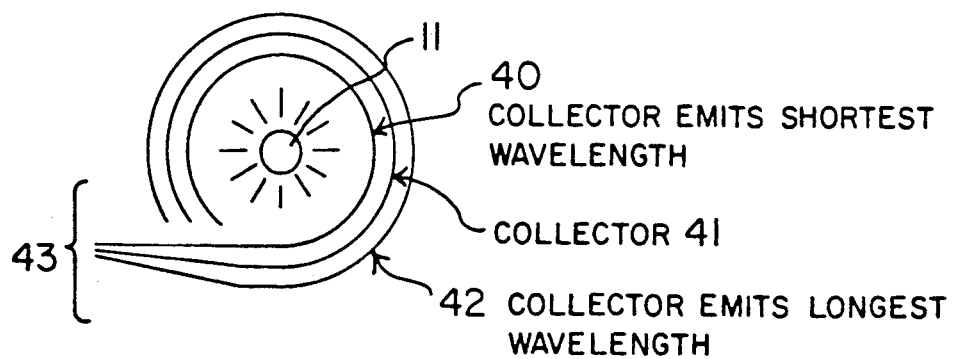
FIG. 4 is side view of a three-color embodiment of the invention wherein the centrally located fluorescent tube is surrounded by three concentric fluorescent dyed polymer tubes, each tube containing a different dyestuff, so as to provide three different colored beams at the three extending edge portions thereof.

FIG. 4 shows a three-color embodiment of the invention that uses the basic structure of FIG. 1. In FIG. 4, centrally located fluorescent lamp 11 is surrounded by three concentric fluorescent dyed polymer tubes or collectors 40,41,42. Each of the collectors 40,41,42 contains a different dyestuff, so as to provide three different colored beams at the three extending edge portions thereof, collectively identified as 43 in FIG. 4. This embodiment of the invention wherein the three plastic sheets 40,41,42 are arranged in a cascaded concentric arrangement about a single fluorescent lamp 11, in order to provide three different color output wavelengths as a plurality of lines of light of different color at edge portion 43, is suggested for use in a color printer utilizing photoactive toners. The arrangement of FIG. 4, and in fact all embodiments of the invention, can of course use to advantage the features of FIGS. 2 and 3, if desired.

Figure 5:
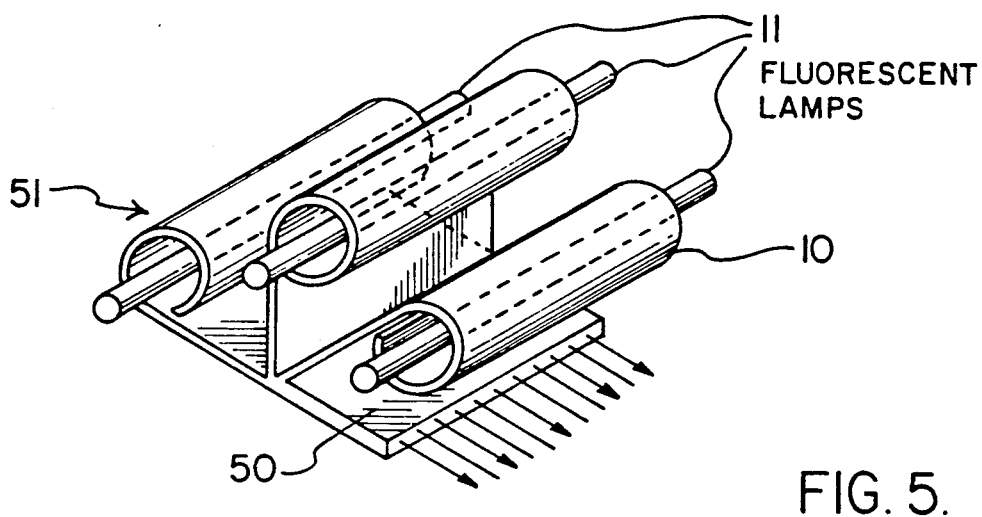
FIG. 5 is a perspective view of a three-lamp embodiment of the invention whereby three devices as shown in FIG. 1 are combined so as to have a common extending edge portion and a common external light beam.

FIG. 5 is a perspective view of a three-lamp embodiment of the invention whereby three devices as shown in FIG. 1 are combined so as to have a common extending edge portion 50 from which one external light beam in emitted. This figure also shows a feature of the invention whereby the polymeric cylinder(s) is formed as a unitary molded assembly 51.

Figure 6:
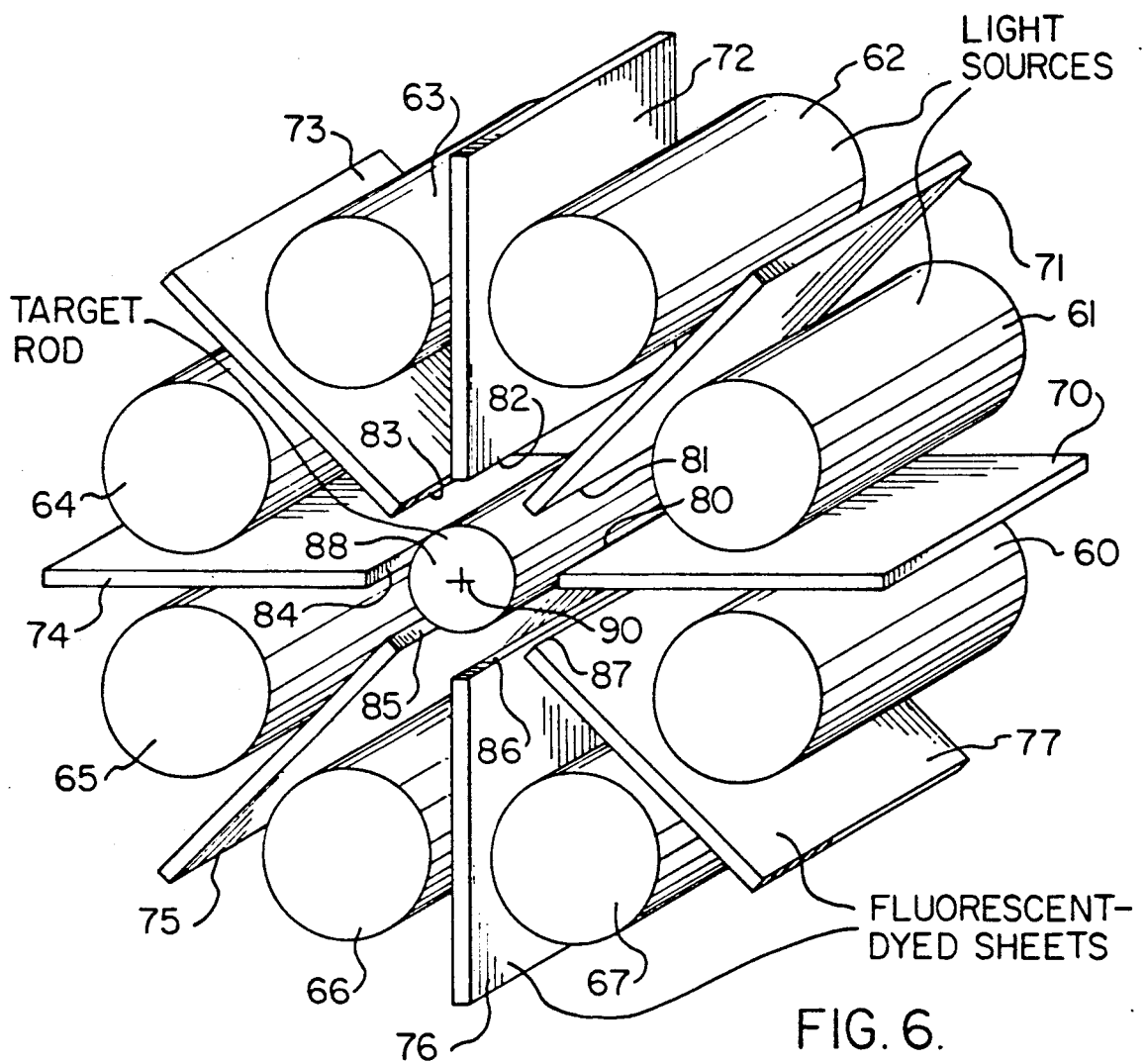
FIG. 6 is a perspective view of an embodiment of the invention, somewhat like that of FIG. 5, wherein a concentric arrangement of eight light sources, having eight intervening sheets of fluorescent dyed polymer, operate to concentrate the output beams from the edges of the eight sheets onto a centrally located target rod.

FIG. 6 discloses embodiment of the invention, somewhat like that of FIG. 5, wherein a concentric arrangement of eight tubular light sources 60-67, having eight intervening sheets 70-77 of fluorescent dyed polymer, operate to concentrate the output beams from the edges 80-87 of the eight sheets 70-77 onto a centrally located light gathering target rod or fiber 88.

In this arrangement, the plurality of linear light sources 60-67 each have a central axis, and the plurality of light sources are mounted with the plurality of central axes thereof arranged to be mutually parallel, the plurality of central axes occupying a cylindrical volume having a central axis that is identified as 90 in FIG. 6. The like plurality of fluorescent dyed polymeric sheets 70-77 are arranged so that each sheet is located between two adjacent ones of the plurality of light sources, so as to receive light from the adjacent two light sources. Each of the plurality of polymeric sheets 70-77 includes a linear extending edge portion 80-87 that extends parallel to central axis 90. Note that edge portions 80-87, if extended, would meet at central axis 90. Light gathering rod 88 is then positioned at central axis 90 in order to gather the light that is emitted by the plurality of edge portions 80–87.

While sheets 70–77 are shown as flat, planar, sheets, it is contemplated that these sheets can be configured to substantially encircle the adjacent ones of the light sources 60–67, so as to receive substantially all of the light that is emitted from these adjacent light sources.

Figure 7:
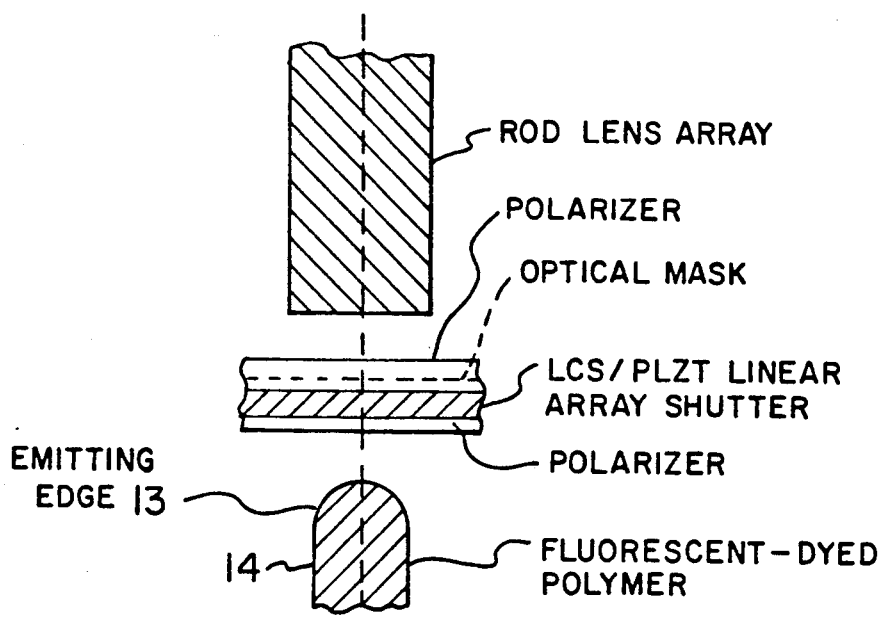
FIG. 7 is a side view of a feature of the invention whereby the extending edge portion and external light beam forms the linear light source for a linear shutter array.

One of the many uses for the invention is that of providing the linear light source for an optical shutter. FIG. 7 shows such a use, wherein the extending edge portion 13 thereof and the external light beam thereof forms the linear light source for a linear shutter array. In this embodiment of the invention, edge portion 13 is provided with a radius in order to effect a collimation of the exiting light beam, for the purpose of improving the gain of the light amplifier by allowing more light to enter the downstream rod lens array. An advantage of using the invention in such a construction is that edge 13 can be located very close to the shutter array, and yet the shutter array is not subjected to heat that is generated by the light source 12 that is associated with edge 13.

Figure 8:
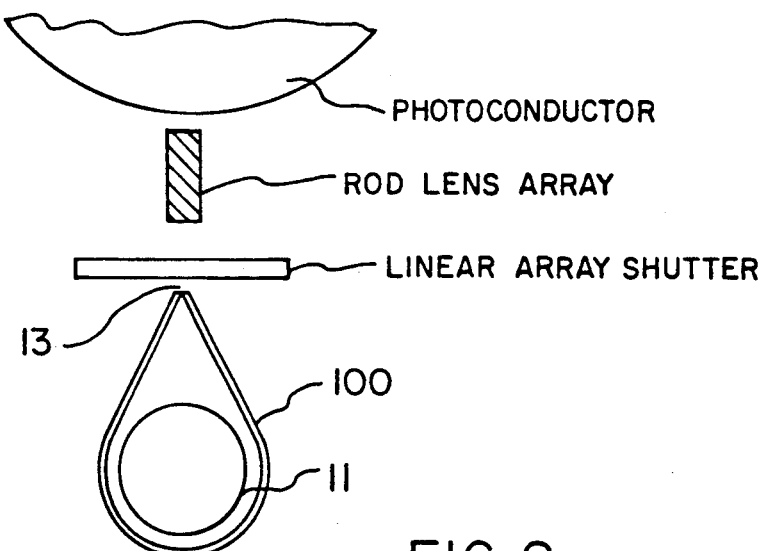
FIG. 8 is a side view of an embodiment of the invention for use in FIG. 7, wherein the light beam emitting edge of FIG. 7 is provided by the abutting double edge that is formed by a wrap around light collecting polymer member.

FIG. 8 is a side view of an embodiment of the invention for use in FIG. 7, wherein the light beam emitting edge 13 of FIG. 7 is provided by the abutting double edge that is formed by a wrap around light collecting polymer member 100.

Figure 9:
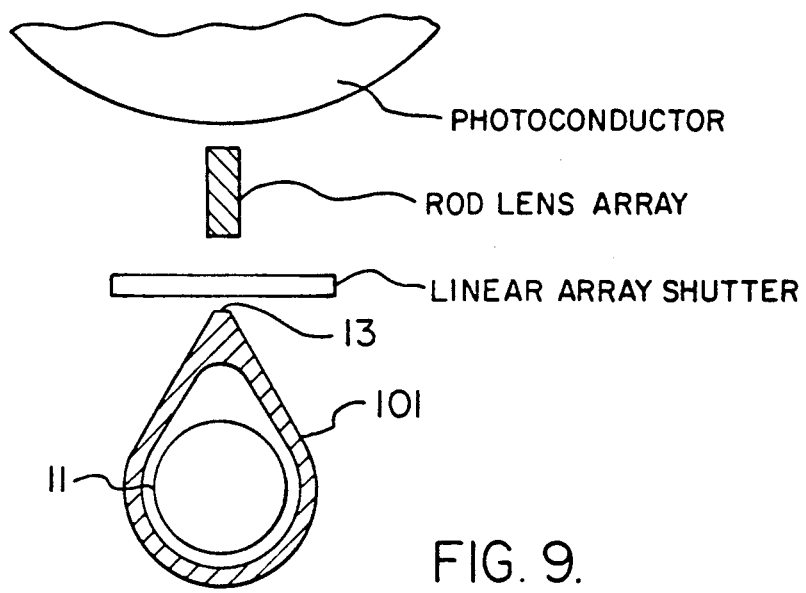
FIG. 9 is a side view of another embodiment of the invention for use in FIG. 7, wherein the light beam emitting edge of FIG. 7 is provided by a unitary extending edge that is formed in a molded light collecting polymer member.

FIG. 9 is a side view of another embodiment of the invention for use in FIG. 7, wherein the light beam emitting edge 13 of FIG. 7 is provided by a unitary extending edge that is formed in a molded light collecting polymer member 101.

Additional utility for the invention is to provide a unit area light amplifier that is useful in the photoconductor portion of a xerographic printer, such as one using a printhead of the general type shown in FIG. 7.

Figure 10:
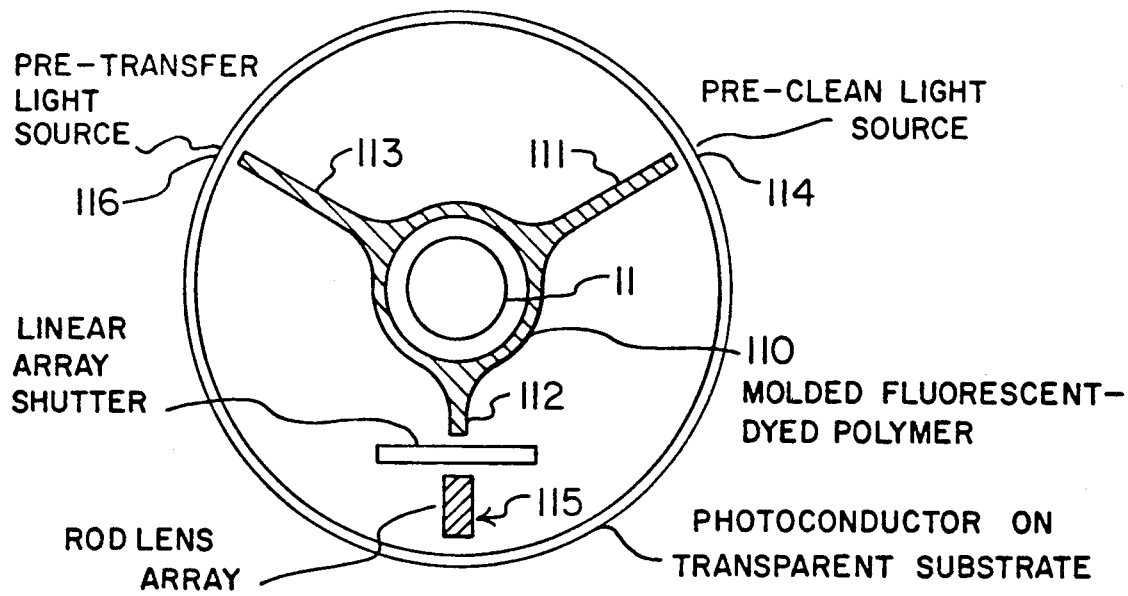
FIG. 10 is a side view of the photoconductor portion of a xerographic printer utilizing a printhead of the general type shown in FIG. 7, wherein one molded fluorescent dyed polymer member is configured with three extending edge portions, so as to provide a linear footprint of light to the printhead, to the pretransfer station, and to the preclean station of the printer.

FIG. 10 shows such an embodiment of the invention wherein one molded fluorescent dyed polymer member 110 is configured with three extending edge portions 111,112,113, so as to provide a linear footprint of light to a preclean station 114, to a printhead imaging station 115, and to a pretransfer station 116.

In this arrangement, tubular light source 11 operates to emit a cylindrical surface of light having a given light intensity per unit area of this said surface. Fluorescent dyed polymer member 110 is arranged to encircle light source 11, to thereby receive substantially all of the light within this cylindrical surface of light. Edge portions 111,112,113 having an aggregate cross-sectional area that is less than the area of the cylindrical surface of light. In this way, light area amplification occurs.

The type of lamp 11 and the type of polymeric material to be used as a light collector therefor are not critical to the invention. A preferred combination is to use a fluorescent lamp having type 219A phosphor therein, for example part number F22T12VHO by the Sylvania Corporation, and a polycarbonate dyed transparent polymer member, color 1261R, dye color 61300 red, thickness 0.012 inch, for example, the brand LISA plastic, part number KL3-9410, by Mobay Chemical Corporation. In this preferred combination, the lamp was of a diameter equal to 12/8 inch, and the polymer member was formed into a cylinder having a 2.0 inch diameter.

While the invention has been described with reference to various embodiments thereof, it is recognized that those skilled in the art will readily envision yet other embodiments that are within the spirit and scope of the invention. Therefore it is intended that the invention be as is defined in the claims.

What is claimed is:

1. A linear light source, comprising,
    an elongated light source providing a radiation pattern in the form of an elongated cylinder, and
    a fluorescent-dyed polymeric sheet wrapped to form a hollow, elongated, cylindrical tube about said light source generally equal in length to said radiation pattern, said polymeric sheet generally enclosing said light source, and having an exposed linear edge,
    said polymeric sheet containing a fluorescent dye that is responsive to radiation from said light source, said fluorescent dye responding to radiation from said light source and operating to generate fluorescent light within said polymeric sheet, and said fluorescent light being transmitted through said polymeric sheet to said linear edge, whereat said fluorescent light exits said polymeric sheet as a line of light.

2. The light source of claim 1 wherein said exposed linear edge is formed to be relatively thick, so as to render said exposed linear edge self supporting, and wherein a tapered end is provided on said exposed linear edge, so as to form said line of light to a desired thickness.

3. The light source of claim 1 wherein said polymeric tube is substantially transparent to said radiation from said light source, and including a tubular mirror surrounding said polymeric tube and operating to redirect any radiation from said light source back into said polymeric tube.

4. The light source of claim 1 including a plurality of said elongated light sources, each of said light sources having a fluorescent-dyed polymeric sheet that is wrapped to form a hollow, elongated, cylindrical tube about said light source, and said plurality of fluorescent-dyed polymeric sheets having one common exposed linear edge.

5. The light source of claim 4 wherein said common exposed linear edge is formed to be relatively thick, and wherein a tapered end is provided on said common linear edge.

6. The light source of claim 5 wherein each of said plurality of polymeric tubes is substantially transparent to said radiation from said light source, and including a tubular mirror surrounding said each of said plurality of polymeric tubes and operating to redirect any radiation from said light source back into its associated polymeric tube.

7. The light source of claim 1 including: a plurality of fluorescent-dyed polymeric sheets concentrically wrapped to form a plurality of hollow, elongated, cylindrical tubes about said light source,
    each of said polymeric sheets containing a different dyestuff so as to generate a different colored fluorescent light within each of said polymeric sheets, and
    said fluorescent light within each of said plurality of polymeric sheets being transmitted therethrough to a linear edge thereof, whereat fluorescent light exits said plurality of polymeric sheets as a plurality of lines of light of different color.

8. The light source of claim 7 wherein the linear edge of each of said plurality of polymeric sheets is formed to be relatively thick, so as render said linear edge self supporting, and wherein a tapered end is provided on each of said linear edges, so as to form said plurality of lines of light to a desired shape.

9. The light source of claim 6 wherein said plurality of polymeric tubes are substantially transparent to said radiation from said light source, and including a tubular mirror surrounding said plurality of polymeric tubes and operating to redirect any radiation from said light source back into said polymeric tubes.

10. In combination;
   a light source providing light radiation of a first spectral characteristic, and in a pattern that generally surrounds said light source, and
   a polymeric sheet wrapped to surround said light source, said polymeric sheet having an externally exposed edge portion,
   said polymeric sheet containing a radiation sensitive material that responds to said radiation of said first spectral characteristic and operates to generate light radiation of a second spectral characteristic within said polymeric sheet, and said generated light of said second spectral characteristic being transmitted to said edge portion, whereat said generated light of said second spectral characteristic exits said polymeric sheet as a beam whose cross section conforms to the shape of said edge portion.

11. The combination of claim 10 wherein said material comprises a dye that is responsive to said radiation of said first characteristic.

12. The combination of claim 11 wherein said light source comprises an elongated and substantially linear light source providing a cylinder of light radiation of said first spectral characteristic, and wherein said polymeric sheet is wrapped to form a hollow tube about said light source, said tube including an extending edge portion operating to form a beam whose cross section is substantially rectangular.

13. The combination of claim 12 wherein said extending edge portion is tapered so as to shape said beam to a desired cross section.

14. The combination of claim 10 including a plurality of said light sources, each of which is surrounded by one of a like plurality of polymeric sheets, and a common extending edge portion for all of said plurality of polymeric sheets.

15. The combination of claim 13 wherein said plurality of polymeric sheets and said common extending edge portion are formed as a unitary molded assembly.

16. The combination of claim 15 wherein said common extending edge portion is tapered in a manner to shape said beam to a desired cross section.

17. The combination of claim 10 further including:
   a linear array shutter means located adjacent said externally exposed edge portion for receiving and selectively transmitting said generated light of said second spectral characteristic,
   a rod lens array means located adjacent said linear array shutter for receiving and transmitting said generated light selectively transmitted from said linear array shutter, and
   a photoconductor means located adjacent said rod lens array for receiving said generated light transmitted from said rod lens array.

18. The combination of claim 17 wherein said material comprises a dye that is responsive to said radiation of said first characteristic.

19. The combination of claim 18 wherein said light source comprises an elongated and substantially linear light source providing a cylinder of light radiation of said first spectral characteristic, and wherein said polymeric sheet is wrapped to form a hollow tube about said light source, said tube including an extending edge portion operating to form a beam whose cross section is substantially rectangular.

20. The combination of claim 19 wherein said extending edge portion is tapered so as to shape said beam to a desired cross section.

21. The combination of claim 19 wherein said polymeric sheet comprises a unitary molded member.

22. A method for providing a light beam to a utilization device that requires a beam intensity of at least N light units per given beam area, comprising the steps of;
   providing low intensity light source means for emitting light over a relatively large area, the intensity of said emitted light over said relatively large area being less than said N light units per given area,
   providing a polymer member structurally arranged with said light source means to occupy said relatively large area in a manner to gather substantially all of the light that is emitted by said light source means, said polymer member having an exposed edge portion,
   tapering said exposed edge portion in a manner to provide an external beam having a beam intensity that is equal to at least N light units per given beam area, and
   transmitting said gathered light through said polymer member to said exposed edge portion, whereat light is emitted as an external beam having a cross section that corresponds to the physical shape of said exposed edge portion, said external beam having a beam intensity that is equal to at least N light units per given beam area.

23. The method of claim 22 wherein said utilization device also requires a beam of a given spectral characteristic, including the steps of;
   providing said low intensity light source means as a light source means whose emitted light is of a spectral characteristic that is different from said given spectral characteristic, and
   providing said polymer member as a fluorescent dyed polymer member that is operable to absorb said emitted light of said different spectral characteristic, and operates to transform said light of said different spectral characteristic into light of said given spectral characteristic.

24. The method of claim 23 including the step of tapering said exposed edge portion in a manner to provide an external beam of a desired cross sectional shape and is of a beam intensity that is equal to at least N light units per given beam area.

25. A unit area light amplifier, comprising;
   light source means operable to emit a surface of light having a given light intensity per unit area of said surface,
   fluorescent dyed polymer means arranged to encircle said light source means, to thereby receive substantially all of the light within said surface of light,
   edge means formed as portion of said polymer means, said edge means having a cross sectional area that is less than the area of said surface of light, and
   wherein said light source means comprises a linear lamp, wherein said surface of light comprises a cylindrical surface of light surrounding said lamp, said cylindrical surface of light having an axis corresponding generally to the position of said lamp, and wherein said polymer means comprises a hollow cylinder surrounding said lamp, said hollow polymer cylinder having an axis corresponding generally to the position of said lamp, and said hollow polymeric cylinder having at least one exposed edge portion comprising said edge means.

26. The light amplifier of claim 25 including a plurality of individual edges extending from said cylinder, said plurality of individual edges having an aggregate cross sectional area that is less than the area of said surface of light.

27. The light amplifier of claim 26 wherein said hollow polymeric cylinder comprises a unitary molded member.

28. The light amplifier of claim 26 wherein said plurality of individual edges comprise generally parallel edges that extend generally parallel to the axis of said polymer cylinder, and including a loop photoconductor surrounding said polymer means and having a like plurality of light sensitive operating stations located to correspond to the positions of said plurality of individual edges.

29. The light amplifier of claim 28 wherein said plurality of light sensitive operating stations include a photoconductor preclean station, a photoconductor imaging station, and a photoconductor pretransfer station.

30. The unit area light sources, of claim 25 further including:
- a plurality of linear light sources, each of said light sources having a central axis, said plurality of light sources being mounted with the plurality of central axes thereof arranged to be mutually parallel, and said plurality of central axes occupying a cylindrical volume having a central axis,
- a like plurality of fluorescent dyed polymeric sheets, each sheet of which is located between two adjacent ones of said plurality light sources, so as to receive light from said adjacent light sources,
- each of said plurality of polymeric sheets including a linear extending edge portion extending parallel to the central axis of said cylindrical volume, said plurality of edge portions being positioned such that if said plurality of edge portions where extended said plurality of edge portions would meet at the central axis of said cylindrical volume, and
- light gathering means positioned at said central axis of said cylindrical volume, the light gathering means being operable to gather light emitted by said plurality of edge portions.

31. The unit area light amplifier of claim 30 wherein said each of said polymeric sheets is configured to substantially encircle said adjacent ones of said light sources as to receive substantially all of the light that is emitted from said adjacent light sources.

32. In combination;
- a plurality of linear light sources, each of said light sources having a central axis, said plurality of light sources being mounted with the plurality of central axes thereof arranged to be mutually parallel, and said plurality of central axes occupying a cylindrical volume having a central axis,
- a like plurality of fluorescent dyed polymeric sheets, each sheet of which is located between two adjacent ones of said plurality light sources, so as to receive light from said adjacent light sources,
- each of said plurality of polymeric sheets including a linear extending edge portion extending parallel to the central axis of said cylindrical volume, said plurality of edge portions being positioned such that if said plurality of edge portions were extended said plurality of edge portions would meet at the central axis of said cylindrical volume, and
- light gathering means positioned at said central axis of said cylindrical volume, the light gathering means being operable to gather light emitted by said plurality of edge portions.

33. The combination of claim 32 wherein said each of said polymeric sheets is configured to substantially encircle said adjacent ones of said light sources, so as to receive substantially all of the light that is emitted from said adjacent light sources.

* * * * *